US010496130B1

(12) United States Patent
Yee

(10) Patent No.: US 10,496,130 B1
(45) Date of Patent: Dec. 3, 2019

(54) ADJUSTABLE FACIAL-INTERFACE SYSTEMS FOR HEAD-MOUNTED DISPLAYS

(71) Applicant: FACEBOOK TECHNOLOGIES, LLC, Menlo Park, CA (US)

(72) Inventor: Phillip Yee, San Francisco, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 324 days.

(21) Appl. No.: 15/652,550

(22) Filed: Jul. 18, 2017

(51) Int. Cl.
*F16B 1/00* (2006.01)
*G06F 1/16* (2006.01)
*F16M 13/04* (2006.01)

(52) U.S. Cl.
CPC ............... *G06F 1/163* (2013.01); *F16B 1/00* (2013.01); *F16M 13/04* (2013.01); *F16B 2001/0035* (2013.01)

(58) Field of Classification Search
CPC .. G02C 5/00; G02C 3/00; G02C 3/003; G06F 1/163; F16B 1/00; F16B 2001/0035; F16M 13/04
USPC ....................................... 351/148, 83, 84, 86
See application file for complete search history.

(56) References Cited

U.S. PATENT DOCUMENTS

| | | | | |
|---|---|---|---|---|
| 1,749,676 A | * | 3/1930 | Sadler | G02C 7/10 351/48 |
| 2,112,644 A | * | 3/1938 | Bausch | G02C 1/08 351/90 |
| 2,388,713 A | * | 11/1945 | Schutz | A62B 18/082 2/9 |
| 2,445,203 A | * | 7/1948 | Bowers | G02C 3/02 2/10 |
| 2,700,765 A | * | 2/1955 | Hoffmaster | A61F 9/025 2/443 |
| 3,079,917 A | * | 3/1963 | Pate | A62B 18/084 128/206.27 |
| 3,406,589 A | | 10/1968 | Gaber | |
| 3,492,037 A | | 1/1970 | Hutchinson | |

(Continued)

OTHER PUBLICATIONS

Phillip Yee et al.; Adjustable Facial-Interface Systems for Head-Mounted Displays; U.S. Appl. No. 15/638,334, filed Jun. 29, 2017.

(Continued)

*Primary Examiner* — William R Alexander
(74) *Attorney, Agent, or Firm* — FisherBroyles, LLP

(57) ABSTRACT

A facial-interface system for a head-mounted display may include (1) a facial interface, (2) a facial-interface mounting member, and (3) a facial-interface adjustment apparatus disposed between the facial interface and the facial-interface mounting member. The facial-interface adjustment apparatus may include (1) an adjustment base that includes a contact surface and (2) an adjustment protrusion that protrudes along an extension axis from the adjustment base to a protrusion end portion of the adjustment protrusion opposite the adjustment base. The adjustment protrusion may include an adjustment surface that is adjacent to the contact surface of the adjustment base. The adjustment protrusion may be rotatable relative to the adjustment base about the extension axis to move the adjustment protrusion axially along the extension axis between a plurality of holding positions relative to the adjustment base. Various other systems, devices, and methods are also disclosed.

20 Claims, 12 Drawing Sheets

(56) References Cited

U.S. PATENT DOCUMENTS

| | | | |
|---|---|---|---|
| 3,587,334 A * | 6/1971 | Willis | F16H 35/10 74/89 |
| 3,704,353 A | 11/1972 | Halla | |
| 4,136,403 A * | 1/1979 | Walther | A62B 18/084 2/10 |
| 4,616,367 A * | 10/1986 | Jean, Jr. | A61F 9/025 2/452 |
| 4,869,586 A * | 9/1989 | Chung | A42B 1/247 351/158 |
| 5,004,276 A | 4/1991 | Hanley | |
| 5,642,177 A * | 6/1997 | Nishioka | G02C 5/08 351/44 |
| 5,657,969 A | 8/1997 | Bivens | |
| 5,724,119 A | 3/1998 | Leight | |
| 5,739,797 A | 4/1998 | Karasawa | |
| 5,739,893 A | 4/1998 | Karasawa | |
| 5,752,276 A | 5/1998 | Baudou | |
| 5,752,280 A | 5/1998 | Hill | |
| 6,421,031 B1 | 7/2002 | Ronzani | |
| 6,424,321 B1 | 7/2002 | Ronzani | |
| 6,669,250 B1 | 12/2003 | St. Louis | |
| 6,762,885 B1 | 7/2004 | Ogasawara | |
| 6,892,393 B1 | 5/2005 | Provost | |
| 7,200,875 B2 * | 4/2007 | Dondero | A61B 5/0002 2/436 |
| 7,667,962 B2 | 2/2010 | Mullen | |
| 7,904,128 B2 | 3/2011 | Harmon et al. | |
| 8,971,023 B2 | 3/2015 | Olsson | |
| 9,423,842 B2 | 8/2016 | Osterhout | |
| 9,442,522 B2 | 9/2016 | Tussy | |
| 9,585,285 B2 | 2/2017 | Nikkhoo | |
| 9,757,534 B2 | 9/2017 | Lang | |
| 9,889,266 B2 | 2/2018 | Lang | |
| 9,989,998 B1 * | 6/2018 | Yee | G06F 1/163 |
| 10,133,305 B1 * | 11/2018 | Sullivan | G06F 1/163 |
| 10,274,000 B1 * | 4/2019 | Bulow | F16B 39/00 |
| 2002/0005819 A1 | 1/2002 | Ronzani | |
| 2002/0129433 A1 | 9/2002 | Shin | |
| 2007/0075918 A1 | 4/2007 | Cuprys | |
| 2008/0158506 A1 | 7/2008 | Fuziak | |
| 2009/0066607 A1 | 3/2009 | Yasuda | |
| 2009/0135506 A1 | 5/2009 | Willey | |
| 2011/0194065 A1 | 8/2011 | Belbey | |
| 2011/0225709 A1 * | 9/2011 | Saylor | A61F 9/025 2/431 |
| 2013/0249776 A1 | 9/2013 | Olsson | |
| 2014/0157496 A1 | 6/2014 | Ginther | |
| 2015/0103306 A1 | 4/2015 | Kaji | |
| 2015/0219901 A1 | 8/2015 | Morimoto | |
| 2015/0238361 A1 * | 8/2015 | McCulloch | A61F 9/029 2/435 |
| 2015/0346494 A1 | 12/2015 | Tanaka | |
| 2016/0011425 A1 * | 1/2016 | Thurber | G02B 27/64 345/8 |
| 2016/0041394 A1 | 2/2016 | Tanaka | |
| 2016/0050345 A1 | 2/2016 | Longbotham | |
| 2016/0124230 A1 | 5/2016 | Hino | |
| 2016/0147069 A1 | 5/2016 | Tanaka | |
| 2016/0193070 A1 | 7/2016 | Castillo | |
| 2017/0105874 A1 * | 4/2017 | Reynolds | A61F 9/025 |
| 2017/0304721 A1 * | 10/2017 | Manuel | A63F 13/25 |
| 2017/0326322 A1 | 11/2017 | Lang | |
| 2018/0095498 A1 * | 4/2018 | Raffle | G02B 7/026 |

OTHER PUBLICATIONS

Phillip Yee et al.; Adjustable Facial-Interface Systems for Head-Mounted Displays; U.S. Appl. No. 15/637,366, filed Jun. 29, 2017.
Sullivan et al.; Facial-Interface Systems for Head-Mounted Displays; U.S. Appl. No. 15/495,775, filed Apr. 24, 2017.
Phillip Yee et al.; Adjustable Facial-Interface Systems for Head-Mounted Displays; U.S. Appl. No. 15/652,565; filed Jul. 18, 2017.

\* cited by examiner

ADJUSTABLE FACIAL-INTERFACE SYSTEMS FOR HEAD-MOUNTED DISPLAYS

BACKGROUND

Putting on a virtual reality headset may be the beginning of a thrilling experience, one that may be more immersive than almost any other digital entertainment or simulation experience available today. Virtual reality headsets may enable users to travel through space and time, interact with friends in a three-dimensional world, or play video games in a radically redefined way. Virtual reality headsets may also be used for purposes other than recreation—governments may use them for military training simulations, doctors may use them to practice surgery, and engineers may use them as visualization aids.

Conventional virtual reality headsets often include cushioned facial interfaces that allow users to position the headsets on their faces. However, a particular cushioned facial interface may not comfortably fit users having various head or face shapes or users who also wear glasses while wearing head-mounted displays. Unfortunately, in order to adjust the fit of a facial interface, users must typically remove a facial-interface cushion from a facial interface and replace it with a cushion of a different size to obtain a desired fit. Accordingly, users often cannot properly adjust the fit of a headset without having a replacement facial interface or interface cushion available.

SUMMARY

As will be described in greater detail below, the instant disclosure generally relates to adjustable facial-interface systems for head-mounted displays, head-mounted-display devices, and methods for assembling adjustable facial-interface systems. In one example, a facial-interface system for a head-mounted display may include (1) a facial interface, (2) a facial-interface mounting member, and (3) a facial-interface adjustment apparatus disposed between the facial interface and the facial-interface mounting member. The facial-interface adjustment apparatus may include (1) an adjustment base that includes a contact surface and (2) an adjustment protrusion that protrudes along an extension axis from the adjustment base to a protrusion end portion of the adjustment protrusion opposite the adjustment base. The adjustment protrusion may include an adjustment surface that is adjacent to the contact surface of the adjustment base. The extension axis may not be normal to the contact surface of the adjustment base or to the adjustment surface of the adjustment protrusion. The adjustment protrusion may be rotatable relative to the adjustment base about the extension axis to move the adjustment protrusion axially along the extension axis between a plurality of holding positions relative to the adjustment base.

In some embodiments, the facial-interface adjustment apparatus may include a spring that biases the adjustment protrusion toward the adjustment base. The facial-interface adjustment apparatus may include a spring holding member that is coupled to the adjustment base and that extends into an adjustment-protrusion recess defined within the adjustment protrusion. In this example, the spring may be disposed between a spring holding surface of the spring holding member and an internal biasing surface of the adjustment protrusion.

In at least one embodiment, the facial-interface adjustment apparatus may include a coupling magnet disposed at the protrusion end portion. In this example, the facial-interface system may include a mounting magnet attached to the facial-interface mounting member or the facial interface and the mounting magnet may be magnetically coupled with the coupling magnet of the facial-interface adjustment apparatus. According to some embodiments, a mounting recess may be defined in the facial-interface mounting member or the facial interface and the adjustment protrusion may be at least partially disposed within the mounting recess. In this example, the facial-interface mounting member or the facial interface may include a mounting recess end surface defining an end portion of the mounting recess and the protrusion end portion of the adjustment protrusion may abut the mounting recess end surface. According to at least one embodiment, the facial interface may be disposed at a separate one of a plurality of locations relative to the facial-interface mounting member when the adjustment protrusion is held at each of the plurality of holding positions.

In some embodiments, the adjustment surface of the adjustment protrusion may be substantially parallel to the contact surface of the adjustment base when the adjustment protrusion is held at a contracted holding position of the plurality of holding positions. In this example, the adjustment surface of the adjustment protrusion may not be parallel to the contact surface of the adjustment base when the adjustment protrusion is held at a holding position of the plurality of holding positions other than the contracted holding position. The adjustment protrusion may include a cylindrical peripheral surface extending between the adjustment surface and the protrusion end portion. In at least one embodiment, the adjustment protrusion may include a non-cylindrical peripheral surface extending between the adjustment surface and the protrusion end portion.

In at least one embodiment, the adjustment protrusion may include a shaft portion that extends into a shaft holding recess defined in the adjustment base. The shaft portion may be rotatable within the shaft holding recess about the extension axis. According to some embodiments, a detent recess may be defined in the adjustment base adjacent to the contact surface and a portion of the adjustment protrusion may be disposed in the detent recess when the adjustment protrusion is held at an extended holding position of the plurality of holding positions. Additionally or alternatively, the adjustment protrusion may include a detent surface adjacent to the adjustment surface and the detent surface may extend at a different angle than the adjustment surface. In this example, the detent surface may abut the contact surface of the adjustment base when the adjustment protrusion is held at an extended holding position of the plurality of holding positions.

A corresponding head-mounted-display device may include (1) a facial interface, (2) a head-mounted-display housing, (3) a facial-interface mounting member coupled to the head-mounted-display housing, and (4) a facial-interface adjustment apparatus disposed between the facial interface and the facial-interface mounting member. In this example, the facial interface may be disposed at a separate one of a plurality of locations relative to the facial-interface mounting member when the adjustment protrusion is held at each of the plurality of holding positions.

A corresponding method may include coupling an adjustment protrusion that includes an adjustment surface to an adjustment base that includes a contact surface such that (1) the adjustment surface of the adjustment protrusion is adjacent to the contact surface of the adjustment base and the adjustment protrusion protrudes along an extension axis from the adjustment base to a protrusion end portion of the adjustment protrusion opposite the adjustment base, (2) the extension axis is not normal to the contact surface of the adjustment base or to the adjustment surface of the adjustment protrusion, and (3) the adjustment protrusion is rotatable relative to the adjustment base about the extension axis to move the adjustment protrusion axially along the extension axis between a plurality of holding positions relative to the adjustment base. The method may additionally include positioning the adjustment protrusion between a facial interface and a facial-interface mounting member.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
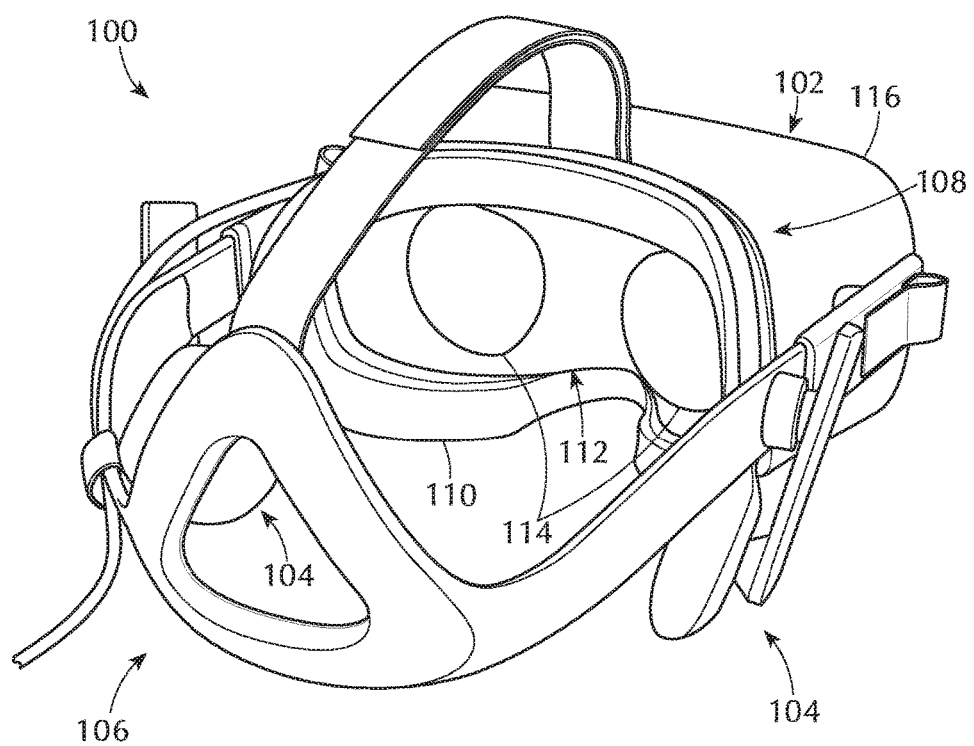
FIG. 1 is a perspective view of an exemplary head-mounted-display system in accordance with some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various adjustable facial-interface systems for head-mounted displays, head-mounted-display devices, and methods for assembling adjustable facial-interface systems. As will be explained in greater detail below, embodiments of the instant disclosure may include facial-interface systems having facial-interface adjustment apparatuses that enable users to quickly and easily adjust facial interfaces. The facial-interface adjustment apparatuses may each include an adjustment base and an adjustment protrusion that protrudes from the adjustment base along an extension axis. The adjustment protrusion may be rotatable relative to the adjustment base about the extension axis to move the adjustment protrusion axially along the extension axis between a plurality of holding positions relative to the adjustment base. Each facial-interface adjustment apparatus may be disposed between a facial interface and a facial-interface mounting member of a head-mounted-display device such that the facial interface is adjustable between a plurality of positions relative to the facial-interface mounting member through adjustment of the facial-interface adjustment apparatus. The facial-interface systems may thus enable users to position the facial interfaces so as to comfortably fit head-mounted displays to various user face sizes and shapes. The facial-interface systems may also enable users to wear accessories, such as glasses, while wearing the head-mounted displays. Accordingly, the facial-interface systems may allow users to adjust and comfortably wear head-mounted displays without having to replace the facial interfaces and/or interface cushions.

The following will provide, with reference to FIG. 1, examples of head-mounted-display systems. In addition, the discussion corresponding to FIGS. 2-8 will provide examples of adjustable facial-interface systems and facial-interface adjustment apparatuses. The discussion corresponding to FIGS. 9 and 10 will also provide examples of head-mounted-display devices that include adjustable facial-interface systems. Finally, the discussion corresponding to FIG. 11 will provide examples of methods for assembling adjustable facial-interface systems.

FIG. 1 is a perspective view of a head-mounted-display system 100 in accordance with some embodiments. In some embodiments, head-mounted-display system 100 may include a head-mounted-display device 102 (i.e., head-mounted display), audio subsystems 104, a strap assembly 106, and a facial-interface system 108. The term "head-mounted display," as used herein, generally refers to any type or form of display device or system that is worn on or about a user's head and displays visual content to the user. Head-mounted displays may display content in any suitable manner, including via a screen (e.g., an LCD or LED screen), a projector, a cathode ray tube, an optical mixer, etc. Head-mounted displays may display content in one or more of various media formats. For example, a head-mounted display may display video, photos, and/or computer-generated imagery (CGI). Head-mounted-display device 102 may include a head-mounted-display housing 116 surrounding various components of head-mounted-display device 102, including lenses 114 and various electronic components, including display components as described above.

Head-mounted displays may provide diverse and distinctive user experiences. Some head-mounted displays may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences. Head-mounted displays may be configured to be mounted to a user's head in a number of ways. Some head-mounted displays may be incorporated into glasses or visors. Other head-mounted displays may be incorporated into helmets, hats, or other headwear. Examples of head-mounted displays may include OCULUS RIFT, GOOGLE GLASS, VIVE, SAMSUNG GEAR, etc.

In some embodiments, audio subsystems 104 may be integrated with head-mounted-display device 102 and may provide audio signals to the user's ears. Head-mounted-display system 100 may, for example, have two audio subsystems 104 located on the left and right sides of head-mounted-display system 100 to provide audio signals to the user's left and right ears, as shown in FIG. 1.

Strap assembly 106 may be used for adjustably mounting head-mounted-display device 102 on the user's head. As shown in FIG. 1, strap assembly 106 may include various straps, such as an upper strap and lower straps, that are coupled to head-mounted-display device 102 to adjustably conform to the top and/or sides of the user's head when the user is wearing head-mounted-display device 102.

In some embodiments, facial-interface system 108 may be configured to comfortably rest against a region of the user's face, including a region surrounding the user's eyes, when head-mounted-display system 100 is worn by the user. In these embodiments, facial-interface system 108 may include a facial interface 110 that contacts selected regions of the user's face. Facial interface 110 may surround a viewing region 112 that includes the user's field of vision while the user is wearing head-mounted-display system 100, allowing the user to look through lenses 114 of head-mounted-display device 102 without interference from outside light while the user is wearing head-mounted-display system 100.

Figure 2:
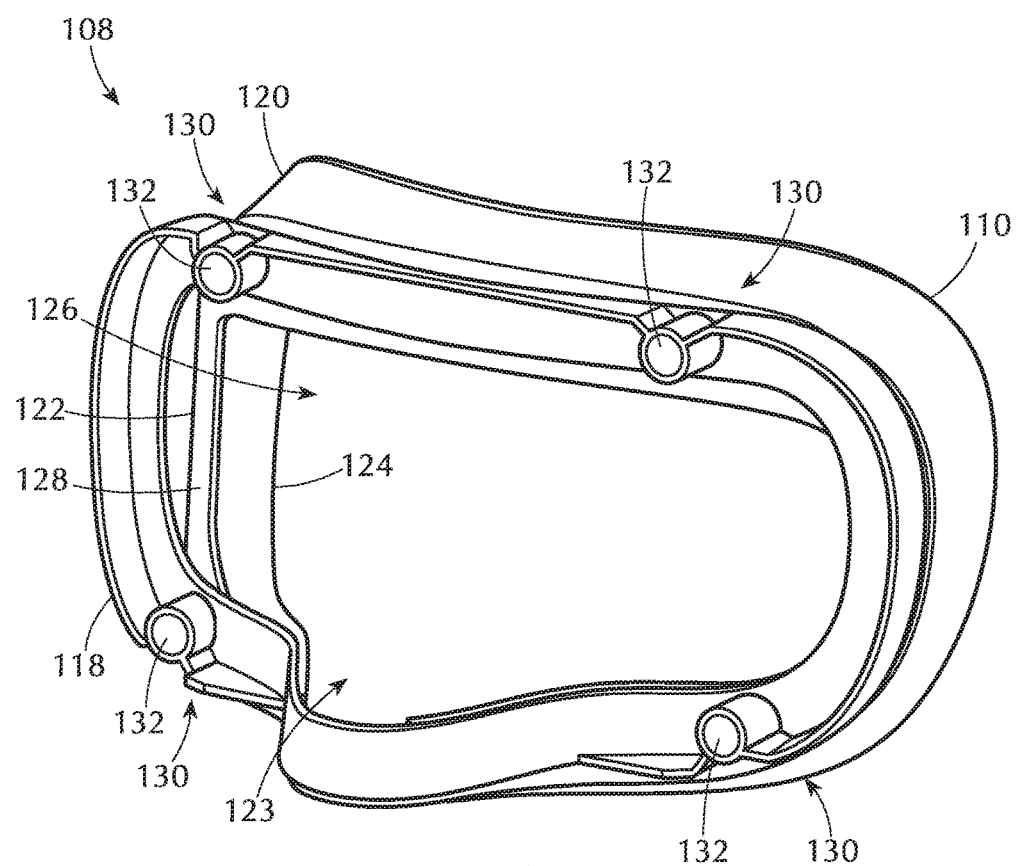
FIG. 2 is a perspective view of an exemplary facial-interface system in accordance with some embodiments.

FIG. 2 shows a facial-interface system 108 that includes facial interface 110 mounted to a facial-interface mounting member 118. As shown in FIG. 2, facial interface 110 may include an interface cushion 120 attached to an interface backing 122. In some embodiments, interface cushion 120 may include or be formed from a pliable material. For example, interface cushion 120 may include or be formed from a foam material (e.g., polyurethane foam) and/or any other pliable material suitable for contacting a facial region of a user and/or suitable for conforming to a shape of interface backing 122. In some examples, the pliable material may enable interface cushion 120 to conform to an attachment surface of interface backing 122. In at least one example, interface cushion 120 may include multiple cushion layers and/or a covering layer over at least a portion of interface cushion 120. Interface backing 122 may be formed of a material having greater rigidity than interface cushion 120, such as a hard or semi-hard polymeric and/or metal material.

Interface cushion 120 may include a facial-abutment surface 124 that is configured to abut facial regions of the user when head-mounted-display system 100 is worn by the user. For example, facial-abutment surface 124 may be configured to abut at least a portion of the user's nose, cheek, temple, and/or forehead facial regions. Interface cushion 120 may be mounted to interface backing 122 at a side of interface cushion 120 opposite facial-abutment surface 124. Facial interface 110 may define a viewing opening 126, which corresponds to, for example, viewing region 112 illustrated in FIG. 1.

In some embodiments, facial interface 110 may be mounted to facial-interface mounting member 118 via one or more facial-interface adjustment apparatuses 130. For example, facial interface 110 may be mounted to facial-interface mounting member 118 with a plurality of facial-interface adjustment apparatuses 130 disposed between facial interface 110 and facial-interface mounting member 118. Facial-interface mounting member 118 may be formed of any suitable material, without limitation, such as, for example, a rigid metal and/or polymeric material. Facial interface 110 may include a display-side surface 128 on a side of interface backing 122 facing facial-interface mounting member 118. In some embodiments, facial-interface mounting member 118 may define a mounting-member opening 123, which corresponds to, for example, viewing region 112 illustrated in FIG. 1. At least one mounting magnet 132 may be disposed in facial-interface mounting member 118 for magnetically coupling facial interface 110 to facial-interface mounting member 118. According to at least one embodiment, facial-interface mounting member 118 may be coupled to head-mounted-display housing 116 and/or any other portion of head-mounted-display device 102 illustrated in FIG. 1. For example, at least a portion of facial-interface mounting member 118 may be disposed within head-mounted-display housing 116 and may be mounted to an internal portion of head-mounted-display housing 116 and/or any other suitable portion of head-mounted-display device 102. In some examples, facial-interface mounting member 118 may be integrally formed with a portion of head-mounted-display device 102, such as a portion of head-mounted-display housing 116.

Figure 3:
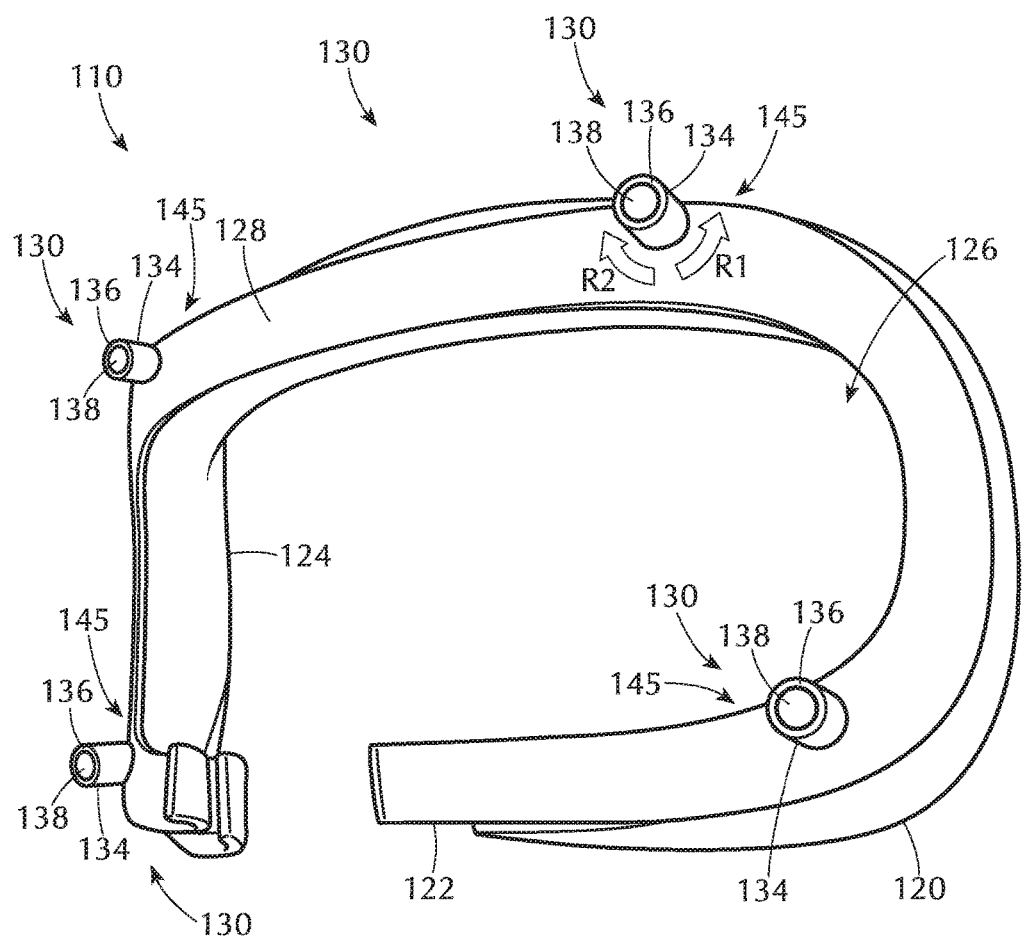
FIG. 3 is a perspective view of an exemplary facial interface in accordance with some embodiments.

FIG. 3 shows a facial interface 110 in accordance with some embodiments. As shown in FIG. 3, facial interface 110 may include a plurality of adjustment protrusions 134 extending from interface backing 122. For example, adjustment protrusions 134 may extend from display-side surface 128 of interface backing 122. While FIG. 3 shows four adjustment protrusions 134 on facial interface 110, facial interface 110 may include any suitable number of adjustment protrusions 134 in any suitable position, without limitation. Each adjustment protrusion 134 may be connected to interface backing 122 at an adjustment base 145, which includes a portion of interface backing 122 and/or is attached to a portion of interface backing 122 adjacent to the corresponding adjustment protrusion 134. Each adjustment protrusion 134 may be sized and shaped to couple with at least a portion of facial-interface mounting member 118 illustrated in FIG. 2. For example, as will be described in greater detail below, each adjustment protrusion 134 may be configured to fit within a corresponding recess defined within facial-interface mounting member 118. Each adjustment protrusion 134 may have any suitable shape, such as a cylindrical or substantially cylindrical shape along at least a portion of the adjustment protrusion as illustrated in FIG. 3. Each adjustment protrusion 134 may additionally or alternatively include any other suitable shape, without limitation. Adjustment protrusions 134 may each include a protrusion end portion 136 at an end opposite interface backing 122 of facial interface 110. Adjustment protrusions 134 may be formed of any suitable material, without limitation, such as, for example, a rigid metal and/or polymeric material.

In some embodiments, a coupling magnet 138 may be disposed within a portion of each adjustment protrusion 134 at and/or adjacent to protrusion end portion 136. Each coupling magnet 138 may magnetically couple with a corresponding mounting magnet 132 (see, e.g., FIG. 2) of facial-interface mounting member 118 when adjustment protrusions 134 of facial interface 110 are disposed within corresponding mounting recesses defined within facial-interface mounting member 118, thereby coupling facial interface 110 to facial-interface mounting member 118. Coupling magnet 138 and/or mounting magnet 132 may be permanent magnets. Additionally or alternatively, adjustment protrusion 134 or facial-interface mounting member 118 may include a ferromagnetic member or layer that couples with a corresponding coupling magnet 138 or mounting magnet 132. In some examples, adjustment protrusions 134 of facial interface 110 may additionally and/or alternatively be mechanically coupled within corresponding mounting recesses defined within facial-interface mounting member 118. For example, adjustment protrusions 134 may be frictionally engaged with surface portions of facial-interface mounting member 118 defining corresponding mounting recesses within facial-interface mounting member 118. Adjustment protrusions 134 may be secured to facial-interface mounting member 118 by any other suitable mechanical, chemical (e.g., adhesive bonding, etc.), and/or magnetic attachment, without limitation.

As illustrated in FIG. 3, each adjustment protrusion 134 may be rotatable in rotational direction R1 and/or rotational direction R2 relative to an adjacent adjustment base 145 of interface backing 122. As will be described in greater detail below with reference to FIGS. 4A through 7B, each adjustment protrusion 134 may be extended and/or contracted with respect to facial interface 110 by rotating adjustment protrusion 134 in rotational direction R1 and/or rotational direction R2. In some embodiments, a user may independently adjust each adjustment protrusion 134 to a desired holding position prior to coupling facial interface 110 to facial-interface mounting member 118. Each adjustment protrusion 134 may be adjusted between two or more holding positions. Each holding position of adjustment protrusion 134 may dispose a corresponding portion of facial-interface mounting member 118 at a different location relative to facial interface 110 when facial interface 110 is mounted to facial-interface mounting member 118. Once each adjustment protrusion 134 is adjusted to the desired holding position of the plurality of holding positions, the user may couple facial interface 110 to facial-interface mounting member 118. If the user desires to readjust the positioning of facial interface 110 with respect to facial-interface mounting member 118, the user may separate facial interface 110 from facial-interface mounting member 118 and rotate one or more adjustment protrusions 134 to reposition the adjustment protrusions 134 in different holding positions. The user may then reattach facial interface 110 to facial-interface mounting member 118. This procedure may be repeated until a desired facial interface fit is achieved by the user.

Figure 8:
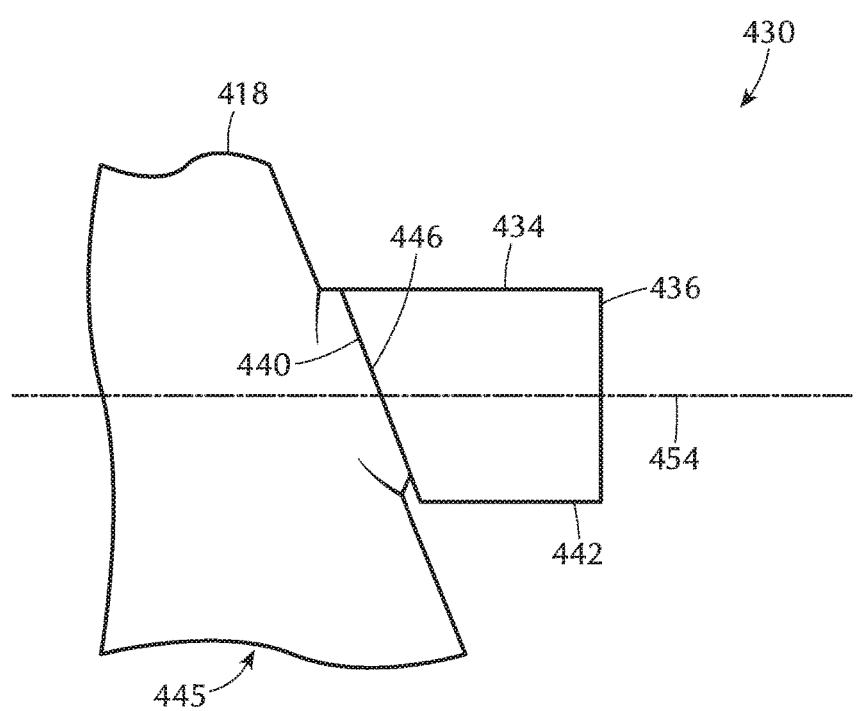
FIG. 8 is a side view of a portion of an exemplary facial-interface mounting member in accordance with some embodiments.

Although FIG. 3 shows adjustment protrusions 134 disposed on facial interface 110, in some embodiments, one or more adjustment protrusions may additionally or alternatively be rotatably disposed on facial-interface mounting member 118 such that the adjustment protrusions extend from a surface portion of facial-interface mounting member 118 facing facial interface 110 (see, e.g., FIG. 8). In such an example, mounting recesses corresponding to each adjustment protrusion may be defined within facial interface 110 (e.g, mounting recesses may be defined within interface backing 122) and each adjustment protrusion may be sized and shaped to fit within such mounting recesses. Facial interface 110 may include mounting magnets, such as mounting magnets 132 shown in FIG. 2, that are disposed near mounting recesses defined within facial interface 110 and that magnetically with couple magnets or ferromagnetic portions of the adjustment protrusions of facial-interface mounting member 118 when the adjustment protrusions are disposed within the mounting recesses.

Figure 4A:
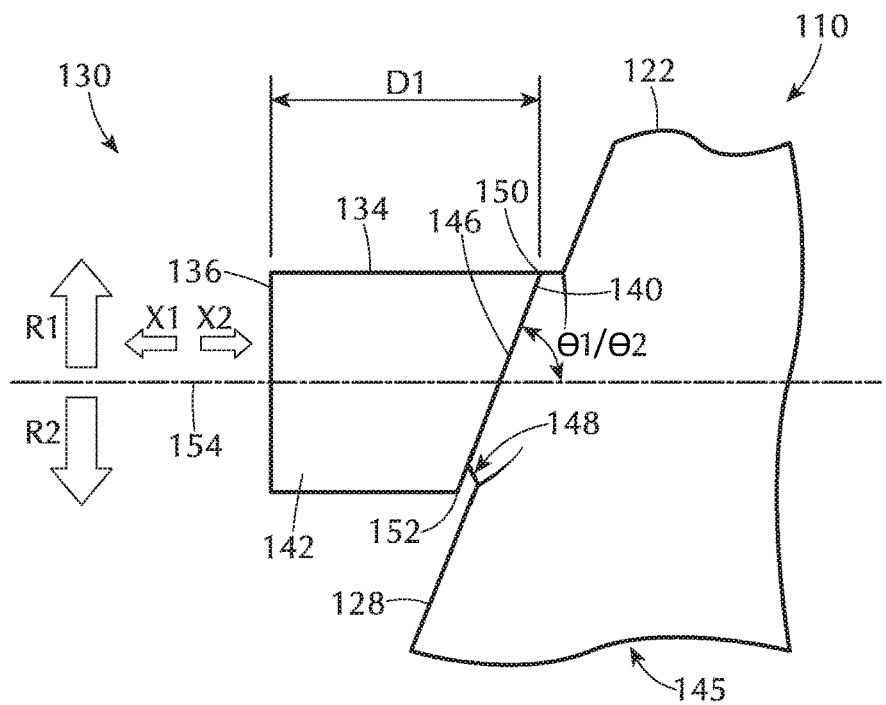
FIGS. 4A and 4B are side views of a portion of an exemplary facial interface in accordance with some embodiments.
Figure 4B:
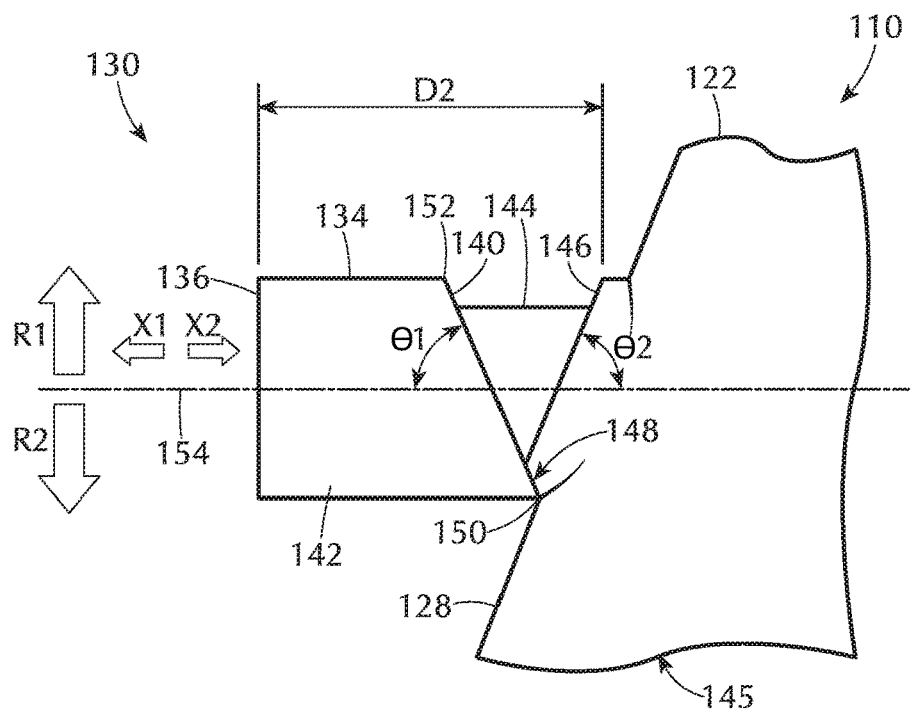

FIGS. 4A and 4B illustrate side views of a portion of facial interface 110 that includes a facial-interface adjustment apparatus 130. FIG. 4A illustrates adjustment protrusion 134 of facial-interface adjustment apparatus 130 in a contracted holding position and FIG. 4B illustrates adjustment protrusion 134 in an extended holding position. As shown in these figures, adjustment protrusion 134 may include an adjustment surface 140 disposed adjacent to adjustment base 145, which may include a portion of interface backing 122. For example, adjustment surface 140 may be disposed adjacent to a contact surface 146 of adjustment base 145. Adjustment base 145 may be integrally formed with or attached to a portion of interface backing 122 of facial interface 110. Adjustment protrusion 134 may protrude along an extension axis 154 from adjustment base 145 to protrusion end portion 136, which is opposite adjustment base 145. Adjustment protrusion 134 may be rotatable about extension axis 154 relative to adjustment base 145 in rotational direction R1 and/or rotational direction R2 (see, e.g., FIG. 3). For example, as shown in FIG. 4B, adjustment protrusion 134 may include a shaft portion 144 that extends into a corresponding shaft holding recess defined within adjustment base 145 (see, e.g., FIGS. 5A and 5B). Shaft portion 144 may have a rounded periphery (e.g., a cylindrical or substantially cylindrical periphery) that is rotatable within the shaft holding recess to rotate adjustment protrusion 134 about extension axis 154.

Adjustment protrusion 134 may be any suitable shape or size, without limitation. For example, adjustment protrusion 134 may have a peripheral surface 142 that has a cylindrical or substantially cylindrical shape along at least a portion of adjustment protrusion 134. Additionally or alternatively, adjustment protrusion 134 may include a peripheral surface that is not cylindrical long at least a portion of adjustment protrusion 134 (see, e.g., FIGS. 6A-6E). As shown in FIGS. 4A and 4B, peripheral surface 142 may extend between protrusion end portion 136 and adjustment surface 140. For example, peripheral surface 142 may extend parallel or substantially parallel to extension axis 154. Adjustment protrusion 134 may include a first adjustment-surface end portion 150 at an intersection of adjustment surface 140 and a portion of peripheral surface 142 that is axially longest and a second adjustment-surface end portion 152 at an intersection of adjustment surface 140 and a portion of peripheral surface 142 that is axially shortest.

As adjustment protrusion 134 is rotated by a user in rotational direction R1 or rotational direction R2, adjustment protrusion 134 may move in an axial direction X1 or an axial direction X2 along extension axis 154 between the contracted holding position shown in FIG. 4A and the extended holding position shown in FIG. 4B. As will be described in greater detail below with respect to FIGS. 5A and 5B, a spring or other suitable biasing member may bias adjustment protrusion 134 in axial direction X2 toward adjustment base 145 such that at least a portion of adjustment protrusion 134 remains in contact with adjustment base 145 as adjustment protrusion 134 is rotated. In some embodiments, extension axis 154 may not be normal (i.e., perpendicular) to either adjustment surface 140 of adjustment protrusion 134 or contact surface 146 of adjustment base 145. For example, adjustment surface 140 of adjustment protrusion 134 may be aligned or substantially aligned along a plane that that is oriented at an oblique angle Θ1 (i.e., acute angle) relative to extension axis 154, and contact surface 146 of adjustment base 145 may be aligned or substantially aligned along another plane that is oriented at an oblique angle Θ2 (i.e., acute angle) relative to extension axis 154. In at least one example, angle Θ1 may be equal or substantially equal to angle Θ2. In this example, adjustment surface 140 of adjustment protrusion 134 may be parallel or substantially parallel to contact surface 146 of adjustment base 145 when adjustment protrusion 134 is in the contracted holding position illustrated in FIG. 4A. In some examples, angle Θ1 may not be equal to angle Θ2 such that adjustment surface 140 of adjustment protrusion 134 is not parallel to contact surface 146 of adjustment base 145 when adjustment protrusion 134 is in the contracted holding position.

The orientations of adjustment surface 140 of adjustment protrusion 134 and contact surface 146 of adjustment base 145 may cause adjustment protrusion 134 to move in axial direction X1 or axial direction X2 as adjustment protrusion 134 is rotated in rotational direction R1 or rotational direction R2 about extension axis 154. For example, when adjustment protrusion 134 is oriented such that adjustment surface 140 is aligned or substantially aligned with contact surface 146 of adjustment base 145, a substantial portion of adjustment surface 140 of adjustment protrusion 134 may closely abut contact surface 146 of adjustment base 145 such that adjustment protrusion 134 is disposed in the contracted holding position shown in FIG. 4A. In the contracted holding position, protrusion end portion 136 of adjustment protrusion 134 may be disposed closest to adjustment base 145. For example, as shown in FIG. 4A, when adjustment protrusion 134 is in the contracted holding position, protrusion end portion 136 may be disposed at a distance D1 from a portion of adjustment base 145 (e.g., a portion of adjustment base 145 adjacent to first adjustment-surface end portion 150 of adjustment protrusion 134).

As adjustment protrusion 134 is rotated in rotational direction R1 or rotational direction R2 from the contracted holding position shown in FIG. 4A, first adjustment-surface end portion 150 of adjustment protrusion 134 may contact and slide along contact surface 146 of adjustment base 145 such that adjustment protrusion 134 is forced in axial direction X1. As adjustment protrusion 134 moves in axial direction X1, second adjustment-surface end portion 152 of adjustment protrusion 134 may be separated from adjustment base 145. For example, adjustment protrusion 134 may be rotated approximately 180° about extension axis 154 from the contracted holding position shown in FIG. 4A such that adjustment protrusion 134 is moved to the extended holding position shown in FIG. 4B. When adjustment protrusion 134 is in the extended holding position, protrusion end portion 136 of adjustment protrusion 134 may be disposed at a distance D2 from a portion of adjustment base 145 (e.g., the portion of adjustment base 145 that is adjacent to first adjustment-surface end portion 150 of adjustment protrusion 134 when adjustment protrusion 134 is in the contracted holding position shown in FIG. 4A). As illustrated in FIG. 4B, distance D2 may be greater than distance D1.

According to some embodiments, a detent recess 148 may be defined in adjustment base 145 adjacent to contact surface 146. A portion of adjustment protrusion 134 may be secured within detent recess 148 when adjustment protrusion 134 is not in the contracted holding position. For example, a portion of adjustment protrusion 134 including first adjustment-surface end portion 150 may be disposed in detent recess 148 when adjustment protrusion 134 is in the extended holding position shown in FIG. 4B. In at least one example, a portion of adjustment surface 140 of adjustment protrusion 134 adjacent to first adjustment-surface end portion 150 may abut a portion of adjustment base 145 defining detent recess 148. Detent recess 148 may securely hold adjustment protrusion 134 in the extended holding position until adjustment protrusion 134 is rotated out of the extended holding position by a user, thereby preventing adjustment protrusion 134 from inadvertently rotating out of the extended holding position. As such, adjustment protrusion 134 may be held in the extended holding position when a force is applied to adjustment protrusion 134 via facial interface 110 by a user's head when head-mounted-display system 100 (see FIG. 1) is secured to the user's head.

Figure 5A:
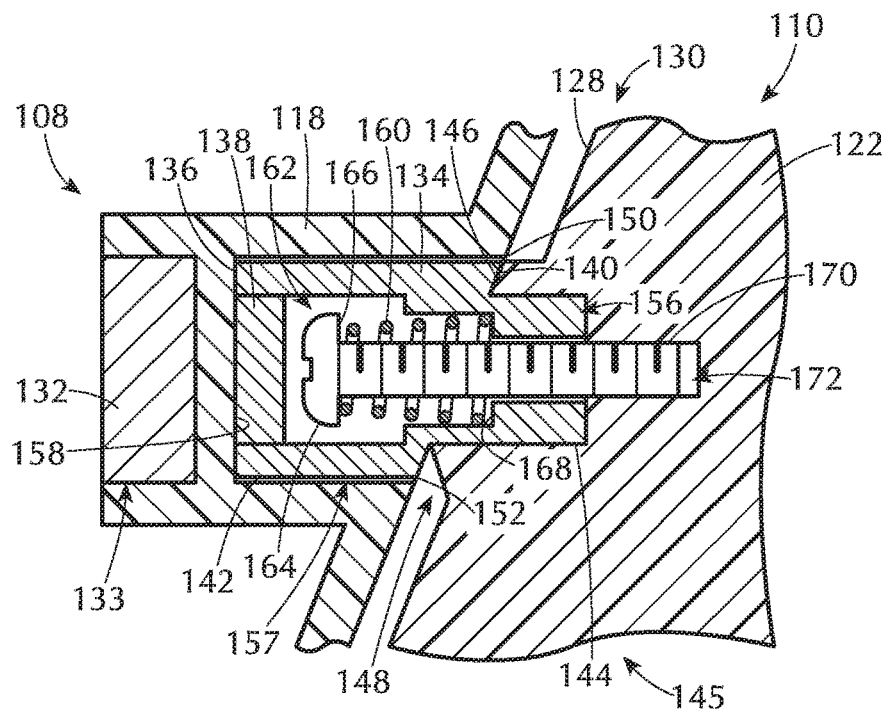
FIGS. 5A and 5B are cross-sectional side views of a portion of an exemplary facial-interface system in accordance with some embodiments.
Figure 5B:
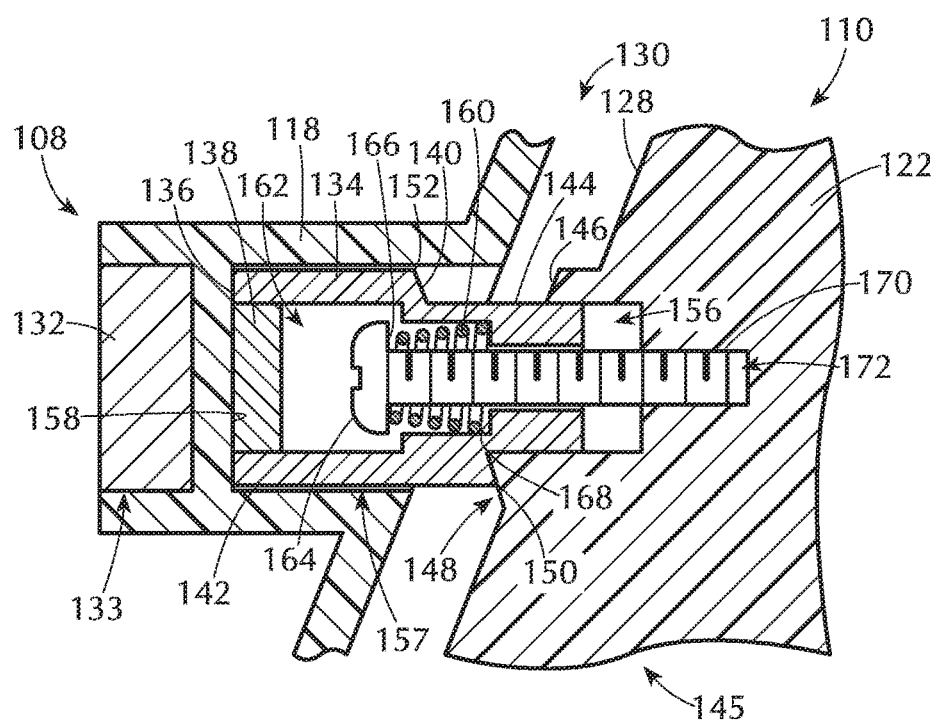

FIGS. 5A and 5B are cross-sectional side views of facial-interface system 108 including facial interface 110 mounted to facial-interface mounting member 118. These figures show a portion of facial-interface mounting member 118 and interface backing 122 of facial interface 110. FIG. 5A illustrates a disposition of facial-interface mounting member 118 relative to interface backing 122 when adjustment protrusion 134 is in the contracted holding position (see, e.g., FIG. 4A) and FIG. 5B illustrates a disposition of facial-interface mounting member 118 relative to interface backing 122 when adjustment protrusion 134 is in the extended holding position (see, e.g., FIG. 4B).

As shown in FIGS. 5A and 5B, facial interface 110 may be mounted to facial-interface mounting member 118 such that at least a portion of adjustment protrusion 134 is disposed within a mounting recess 157 defined within facial-interface mounting member 118. Adjustment protrusion 134 may include coupling magnet 138 adjacent to protrusion end portion 136. For example, coupling magnet 138 may be secured within an adjustment-protrusion recess 162 defined within adjustment protrusion 134. When facial interface 110 is mounted to facial-interface mounting member 118, protrusion end portion 136 and/or coupling magnet 138 may be positioned within mounting recess 157 adjacent to and/or abutting a mounting-recess end surface 158 of facial-interface mounting member 118 defining an end portion of mounting recess 157. In this configuration, coupling magnet 138 of adjustment protrusion 134 may be located in close proximity to mounting magnet 132 of facial-interface mounting member 118 such that coupling magnet 138 is magnetically coupled with mounting magnet 132, thereby securing adjustment protrusion 134 to facial-interface mounting member 118. Additionally or alternatively, a portion of facial-interface mounting member 118 defining mounting recess 157 may be sized and shaped to frictionally engage adjustment protrusion 134 to secure adjustment protrusion 134 to facial-interface mounting member 118.

In some embodiments, adjustment base 145 of interface backing 122 may define a shaft holding recess 156 and shaft portion 144 of adjustment protrusion 134 may be rotatably disposed within shaft holding recess 156. Shaft portion 144 may extend from adjustment surface 140 of adjustment protrusion 134 to a sufficient extent that at least a portion of shaft portion 144 remains within shaft holding recess 156 when adjustment protrusion 134 is in the extended holding position shown in FIG. 5B. According to at least one embodiment, facial-interface adjustment apparatus 130 may include a biasing member that biases adjustment protrusion 134 against adjustment base 145 so as to force adjustment protrusion 134 into abutment with adjustment base 145 and secure shaft portion 144 within shaft holding recess 156 defined within adjustment base 145. For example, facial-interface adjustment apparatus 130 may include a spring 160 that is disposed within adjustment-protrusion recess 162 defined in adjustment protrusion 134. Spring 160 may be any suitable type of spring, without limitation, such as, for example, a compression spring (e.g., a conical compression spring). In this example, facial-interface adjustment apparatus 130 may also include a spring holding member 164 that is coupled to adjustment base 145 and extends into adjustment-protrusion recess 162 defined within adjustment protrusion 134. For example, spring holding member 164 may include a spring holding surface 166 that abuts an end portion of spring 160 and a base coupling portion 170 that extends from spring holding surface 166 into a base coupling recess 172 defined within adjustment base 145 of interface backing 122.

Spring holding member 164 may be any component suitable for coupling with adjustment base 145 and abutting spring 160, without limitation. For example, spring holding member 164 may be a bolt or screw having a threaded base coupling portion 170 that is threadedly attached to adjustment base 145 within base coupling recess 172. Additionally or alternatively, base coupling portion 170 may, for example, be bonded to adjustment base 145 and/or may be secured within base coupling recess 172 by frictional engagement with adjustment base 145. Spring holding surface 166 may be formed by a portion of spring holding member 164, such as a head portion of spring holding member 164, having a wider diameter than base coupling portion 170 of spring holding member 164. In this example, spring 160 may surround a portion of base coupling portion 170. As shown in FIGS. 5A and 5B, spring 160 may be disposed between spring holding surface 166 of spring holding member 164 and an internal biasing surface 168 of adjustment protrusion 134 defining adjustment-protrusion recess 162 such that spring 160 is in at least a partially compressed state so as to bias adjustment protrusion 134 toward adjustment base 145 when adjustment protrusion 134 is in the contracted holding position and in the extended holding position. As adjustment protrusion 134 moves between the contracted holding position and the extended holding position, adjustment protrusion 134 may move relative to spring holding member 164, which is secured to adjustment base 145.

As shown in FIG. 5A, when adjustment protrusion 134 is in the contracted holding position, a portion of facial-interface mounting member 118 adjacent to adjustment protrusion 134 may be positioned closest to facial interface 110. When adjustment protrusion 134 is in the extended holding position shown in FIG. 5B, the portion of facial-interface mounting member 118 adjacent to adjustment protrusion 134 may be positioned further from facial interface 110 then when adjustment protrusion 134 is in the contracted holding position. Accordingly, by adjusting adjustment protrusion 134 between the contracted holding position and the extended holding position, a user may adjust the mounted position of facial interface 110 with respect to facial-interface mounting member 118.

Figure 6A:
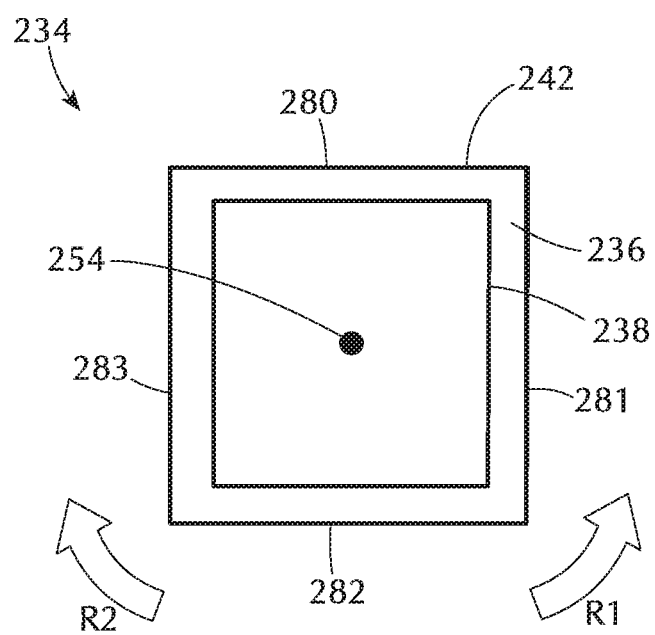
FIG. 6A is a front view of an exemplary adjustment protrusion in accordance with some embodiments.

FIGS. 6A-6E show a portion of a facial interface 210 that includes a facial-interface adjustment apparatus 230 having an adjustment protrusion 234 with a non-cylindrical peripheral surface 242. As shown in these figures, peripheral surface 242 of adjustment protrusion 234 may, for example, have a quadrilateral (e.g., square, rectangular, etc.) or other angular or otherwise non-cylindrical cross-sectional shape. For example, as shown in FIG. 6A, peripheral surface 242 may include four planar or substantially planar side surfaces, including first side surface 280, second side surface 281, third side surface 282, and fourth side surface 283. In this example, adjustment protrusion 234 may include a protrusion end portion 236 and a coupling magnet 238, and adjustment protrusion 234 may be rotatable in rotational direction R1 and/or rotational direction R2 about an extension axis 254 with respect to an adjustment base 245 of an interface backing 222 shown in FIGS. 6B-6E.

As illustrated in FIGS. 6B-6E, adjustment protrusion 234 may be rotatable about extension axis 254 between a plurality of holding positions. For example, a shaft portion 244 of adjustment protrusion 234 may rotate within a corresponding shaft holding recess (see, e.g., shaft holding recess 156 illustrated in FIGS. 5A and 5B) defined within adjustment base 245. As shown in these figures, adjustment protrusion 234 may include an adjustment surface 240 adjacent to an abutment surface 246 of adjustment base 245. In some embodiments, extension axis 254 may not be normal (i.e., perpendicular) to either adjustment surface 240 of adjustment protrusion 234 or abutment surface 246 of adjustment base 245.

In some embodiments, adjustment protrusion 234 may include a first adjustment end portion 250, a second adjustment end portion 251, a third adjustment end portion 252, and a fourth adjustment end portion 253 at peripheral regions of adjustment surface 240. For example, first adjustment end portion 250 may be located at a junction of adjustment surface 240 and a portion of peripheral surface 242 that is axially longest (i.e., an edge between first side surface 280 and fourth side surface 283 as shown in FIG. 6C) and third adjustment end portion 252 may be located at a junction of adjustment surface 240 and a portion of peripheral surface 242 that is axially shortest (i.e., an edge between second side surface 281 and third side surface 282 as shown in FIG. 6E). Additionally, second adjustment end portion 251 may be located at a junction of adjustment surface 240, first side surface 280, and second side surface 281 of adjustment protrusion 134 (see FIG. 6B) and fourth adjustment end portion 253 may be located at a junction of adjustment surface 240, third side surface 282, and fourth side surface 283 of adjustment protrusion 134 (see FIG. 6D). In at least one example, adjustment surface 240 may be oriented along a plane such that second adjustment end portion 251 and fourth adjustment end portion 253 are disposed at different distances relative to protrusion end portion 236 of adjustment protrusion 234. In some examples, adjustment surface 240 may be oriented along a plane such that second adjustment end portion 251 and fourth adjustment end portion 253 are disposed at approximately the same distance relative to protrusion end portion 236. Such configurations may enable adjustment protrusion 234 be held at a plurality of different holding positions (e.g., three or four holding positions) relative to adjustment base 245.

Figure 6B:
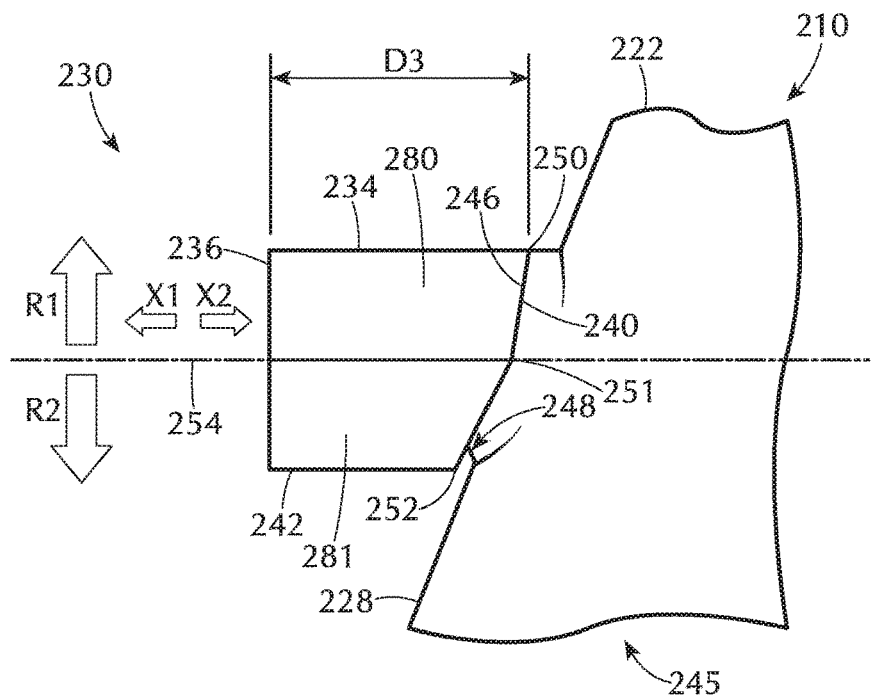
FIGS. 6B-6E are side views of a portion of an exemplary facial interface in accordance with some embodiments
Figure 6C:
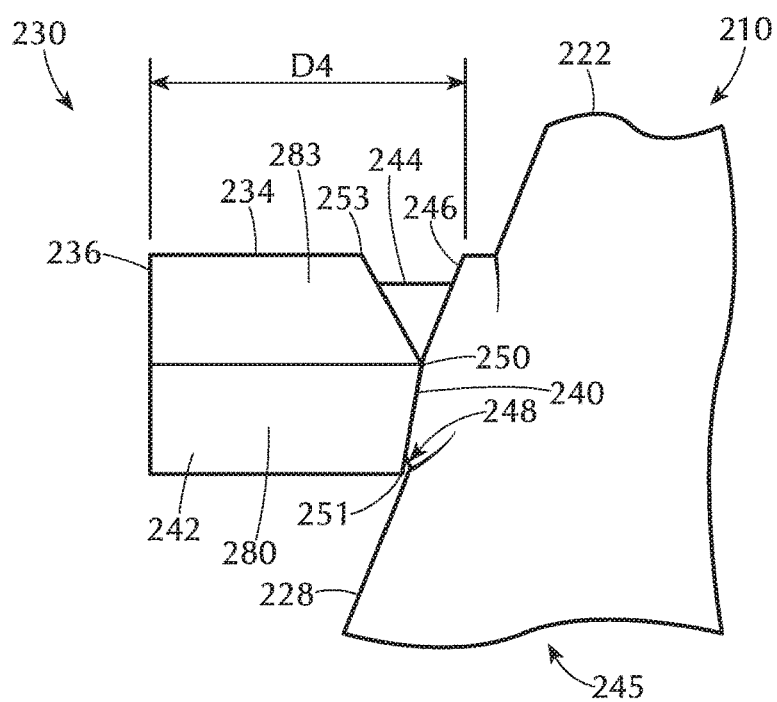

FIG. 6B shows adjustment protrusion 234 in a contracted holding position. As shown in this figure, adjustment protrusion 234 may define a detent recess 248 adjacent to abutment surface 246, such as a region between abutment surface 246 and display-side surface 228 of adjustment base 245. As adjustment protrusion 234 is rotated in rotational direction R1 or rotational direction R2, adjustment protrusion 234 may move in axial direction X1 or axial direction X2 along extension axis 254. In the contracted holding position, protrusion end portion 236 of adjustment protrusion 234 may be disposed at a distance D3 from a portion of adjustment base 245 (e.g., a portion of adjustment base 245 adjacent to first adjustment end portion 250 of adjustment protrusion 234).

As adjustment protrusion 234 is rotated, for example, in rotational direction R2 from the contracted holding position shown in FIG. 6B by a user, adjustment protrusion 234 may be forced in axial direction X1 to a first extended holding position shown in FIG. 6C. In the first extended holding position, a portion of adjustment protrusion 234 at or near second adjustment end portion 251 may be held in detent recess 248 defined by adjustment base 245 such that protrusion end portion 236 of adjustment protrusion 234 is disposed at a distance D4, which is greater than distance D3 corresponding to the contracted holding position shown in FIG. 6B, from the portion of adjustment base 245 as illustrated in FIG. 6C.

Subsequently, as adjustment protrusion 234 is rotated in rotational direction R2 from the first extended holding position shown in FIG. 6C by the user, adjustment protrusion 234 may be further forced in axial direction X1 to a second extended holding position shown in FIG. 6D. In the second extended holding position, a portion of adjustment protrusion 234 at or near first adjustment end portion 250 may be held in detent recess 248 defined by adjustment base 245 such that protrusion end portion 236 of adjustment protrusion 234 is disposed at a distance D5, which is greater than distance D4 corresponding to the first holding position shown in FIG. 6C, from the portion of adjustment base 245 as illustrated in FIG. 6D.

Figure 6D:
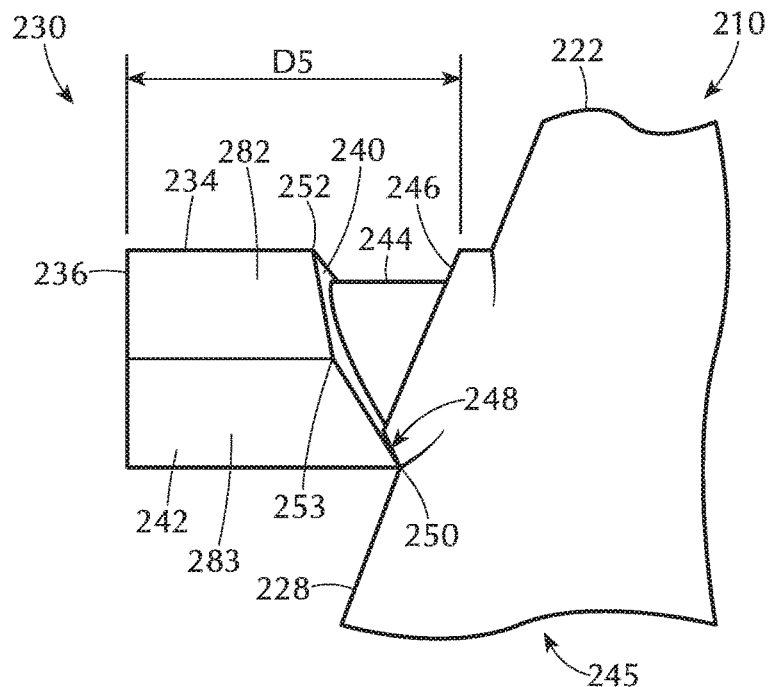
Figure 6E:
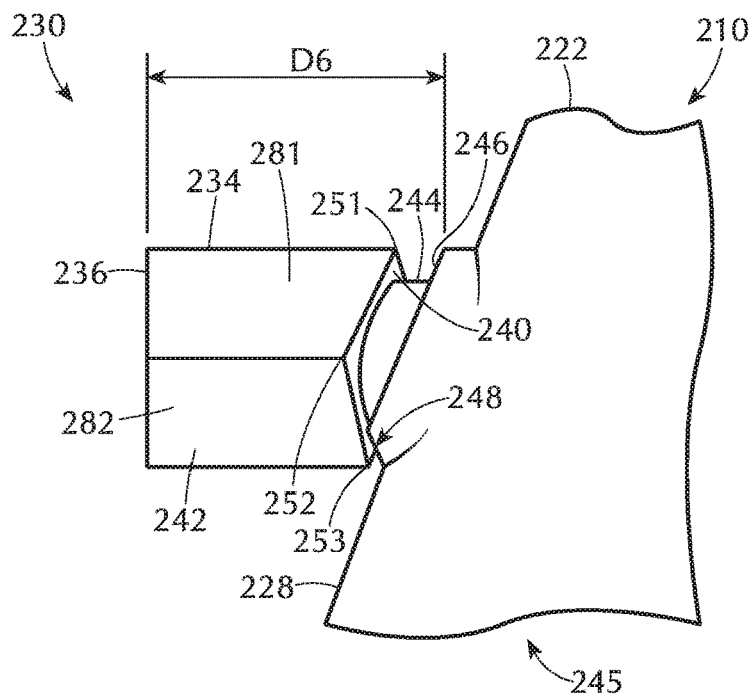

As adjustment protrusion 234 is further rotated in rotational direction R2 from the second extended holding position shown in FIG. 6D by the user, adjustment protrusion 234 may move in axial direction X2 to a third extended holding position shown in FIG. 6E. In the third extended holding position, a portion of adjustment protrusion 234 at or near fourth adjustment end portion 253 may be held in detent recess 248 defined by adjustment base 245 such that protrusion end portion 236 of adjustment protrusion 234 is disposed at a distance D6, which is greater than distance D3 corresponding to the contracted holding position shown in FIG. 6B and less than distance D5 corresponding to the second holding position shown in FIG. 6D, from the portion of adjustment base 245 as illustrated in FIG. 6E. Distance D6 shown in FIG. 6E may be equal to or different than the distance D4 corresponding to the first holding position shown in FIG. 6C. Adjustment protrusion 234 may be subsequently rotated in rotational direction R2 from the third extended holding position shown in FIG. 6E back to the contracted holding position illustrated in FIG. 6B. Accordingly, adjustment protrusion 234 be rotated between a plurality of separate holding positions (e.g., three or four holding positions) relative to adjustment base 245.

Figure 7A:
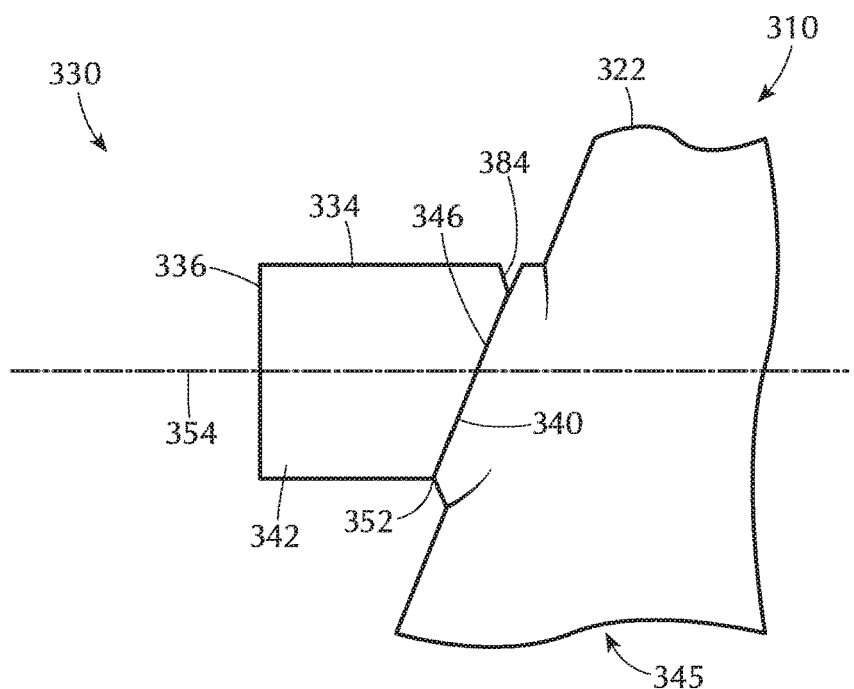
FIGS. 7A and 7B are side views of a portion of an exemplary facial interface in accordance with some embodiments.
Figure 7B:
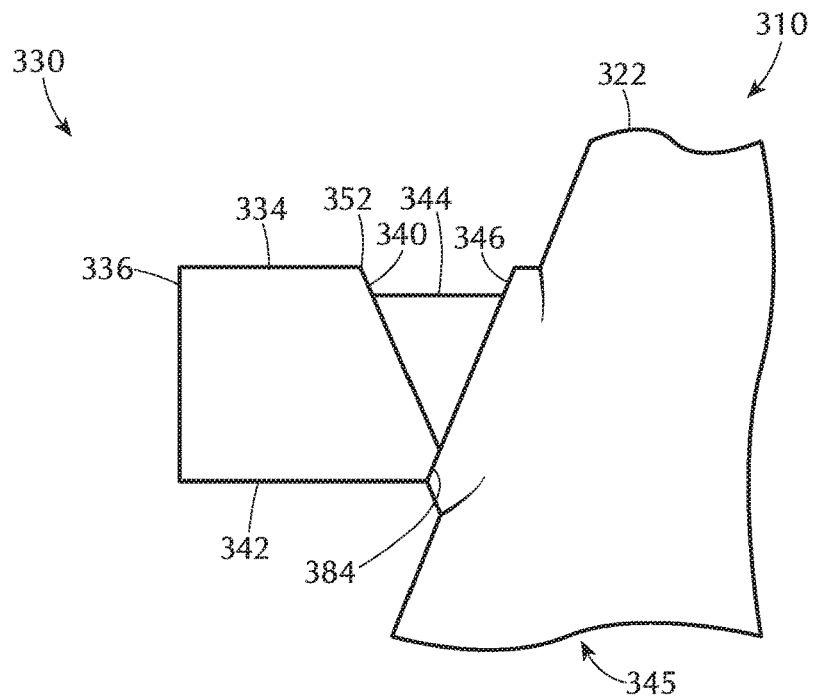

FIGS. 7A and 7B show a portion of a facial interface 310 that includes a facial-interface adjustment apparatus 330. As shown in these figures, facial-interface adjustment apparatus 330 may include an adjustment protrusion 334 that includes a detent surface 384. Adjustment protrusion 334 may include an adjustment surface 340 disposed adjacent to an adjustment base 345 of interface backing 322. For example, adjustment surface 340 may be disposed adjacent to an abutment surface 346 of adjustment base 345. Adjustment protrusion 334 may also include a peripheral surface 342 having any suitable shape (e.g., a cylindrical or substantially cylindrical shape) extending between adjustment surface 340 and a protrusion end portion 336. Detent surface 384 of adjustment protrusion 334 may be located adjacent to a peripheral portion of adjustment surface 340 such that detent surface 384 extends between adjustment surface 340 and peripheral surface 342. Adjustment protrusion 334 may be rotatable about an extension axis 354 between a contracted holding position illustrated in FIG. 7A and an extended holding position illustrated in FIG. 7B. For example, a shaft portion 344 of adjustment protrusion 334 may rotate within a corresponding shaft holding recess (see, e.g., shaft holding recess 156 illustrated in FIGS. 5A and 5B) defined within adjustment base 345.

When adjustment protrusion 334 is in the extended holding position shown in FIG. 7B, detent surface 384 of adjustment protrusion 334 may abut at least a portion of adjustment base 345. For example, as shown in FIG. 7B, detent surface 384 may abut abutment surface 346 of adjustment base 345. Detent surface 384 may securely hold adjustment protrusion 334 in the extended holding position until adjustment protrusion 334 is rotated out of the extended holding position by a user, thereby preventing adjustment protrusion 334 from inadvertently rotating out of the extended holding position. In some embodiments, an adjustment protrusion may include a plurality of detent surfaces. For example, a non-cylindrical adjustment protrusion, such as that shown in FIGS. 6A-6E, may include a plurality of detent surfaces to secure the adjustment protrusion at each of a plurality of extended holding positions.

FIG. 8 shows show a portion of a facial-interface mounting member 418 that includes a facial-interface adjustment apparatus 430. As shown in this figure, facial-interface adjustment apparatus 430 may include an adjustment protrusion 434 having an adjustment surface 440 disposed adjacent to an adjustment base 445 of facial-interface mounting member 418. For example, adjustment surface 440 may be disposed adjacent to an abutment surface 446 of adjustment base 445. Adjustment protrusion 434 may also include a peripheral surface 442 having any suitable shape (e.g., a cylindrical or non-cylindrical) extending between adjustment surface 440 and a protrusion end portion 436. Adjustment protrusion 434 may be rotatable about an extension axis 454 between a contracted holding position as shown in FIG. 8 and an extended holding position (see, e.g., FIG. 4B). In some embodiments, adjustment protrusion 434 may be coupled to a corresponding facial interface. For example, adjustment protrusion 434 may be disposed within a coupling recess defined within a corresponding facial interface such that the facial interface is mounted to facial-interface mounting member 418.

Figure 9:
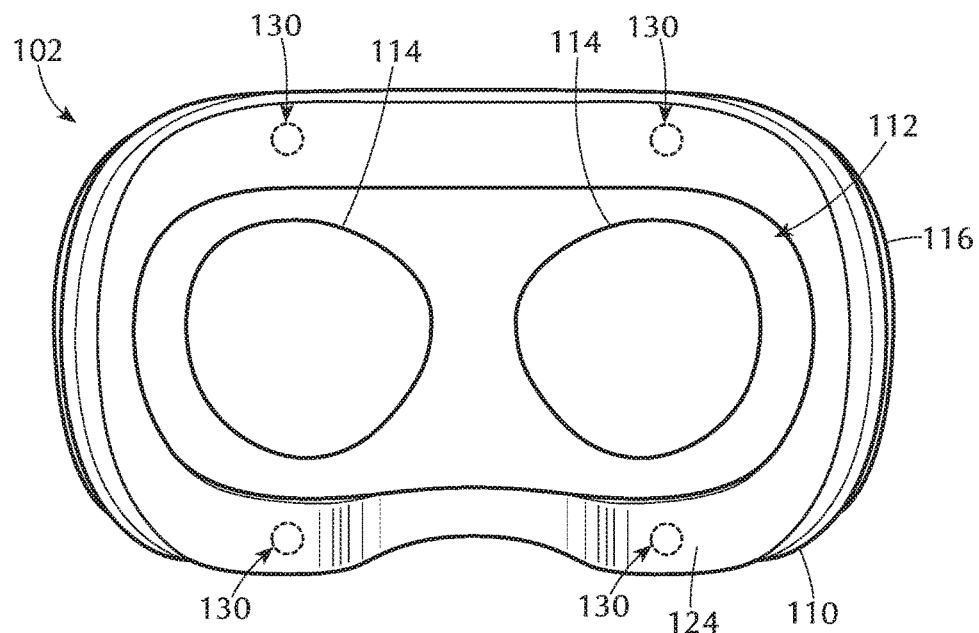
FIG. 9 is a front view of an exemplary head-mounted-display device in accordance with some embodiments.
Figure 10:
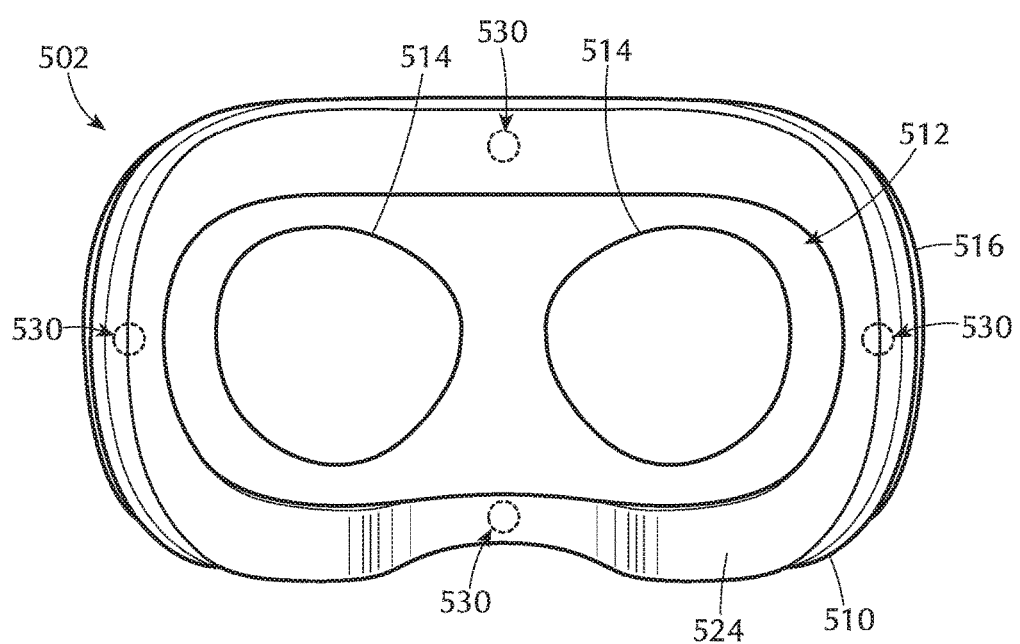
FIG. 10 is a front view of an exemplary head-mounted-display device in accordance with some embodiments.

FIGS. 9 and 10 show exemplary head-mounted-display devices having facial-interface adjustment apparatuses that are disposed in various configurations. Head-mounted-display devices may include facial-interface adjustment apparatuses that are disposed adjacent to portions of facial interfaces configured to abut various user facial regions, including nasal, cheek, temple, and/or forehead facial regions. Head-mounted-display devices, as disclosed herein, may include any suitable number of facial-interface adjustment apparatuses disposed at any suitable locations, without limitation. FIG. 9 shows a front view of head-mounted-display device 102 having facial interface 110 surrounding viewing region 112, which allows a user to view content displayed through lenses 114. Head-mounted-display device 102 may include a plurality of facial-interface adjustment apparatuses 130 between facial interface 110 and facial-interface mounting member 118 (see, e.g., FIGS. 2, 5A, and 5B). For example, as shown in FIG. 9, head-mounted-display device 102 may include at least four facial-interface adjustment apparatuses 120 disposed at portions of facial interface 110 that abut cheek regions and forehead regions of the user's face when the user wears head-mounted-display device 102.

FIG. 10 shows a front view of a head-mounted-display device 502 having a facial interface 510 that surrounds a viewing region 512, which allows a user to view content displayed through lenses 514. Head-mounted-display device 502 may include a plurality of facial-interface adjustment apparatuses 530 between facial interface 510 and a corresponding facial-interface mounting member (see, e.g., facial-interface mounting member 118 shown in FIGS. 2, 5A, and 5B). For example, as shown in FIG. 10, head-mounted-display device 502 may include at least four facial-interface adjustment apparatuses 530 disposed adjacent to portions of facial interface 510 that abut a forehead region, a nasal region, and temple regions of the user's face when the user wears head-mounted-display device 502.

Figure 11:
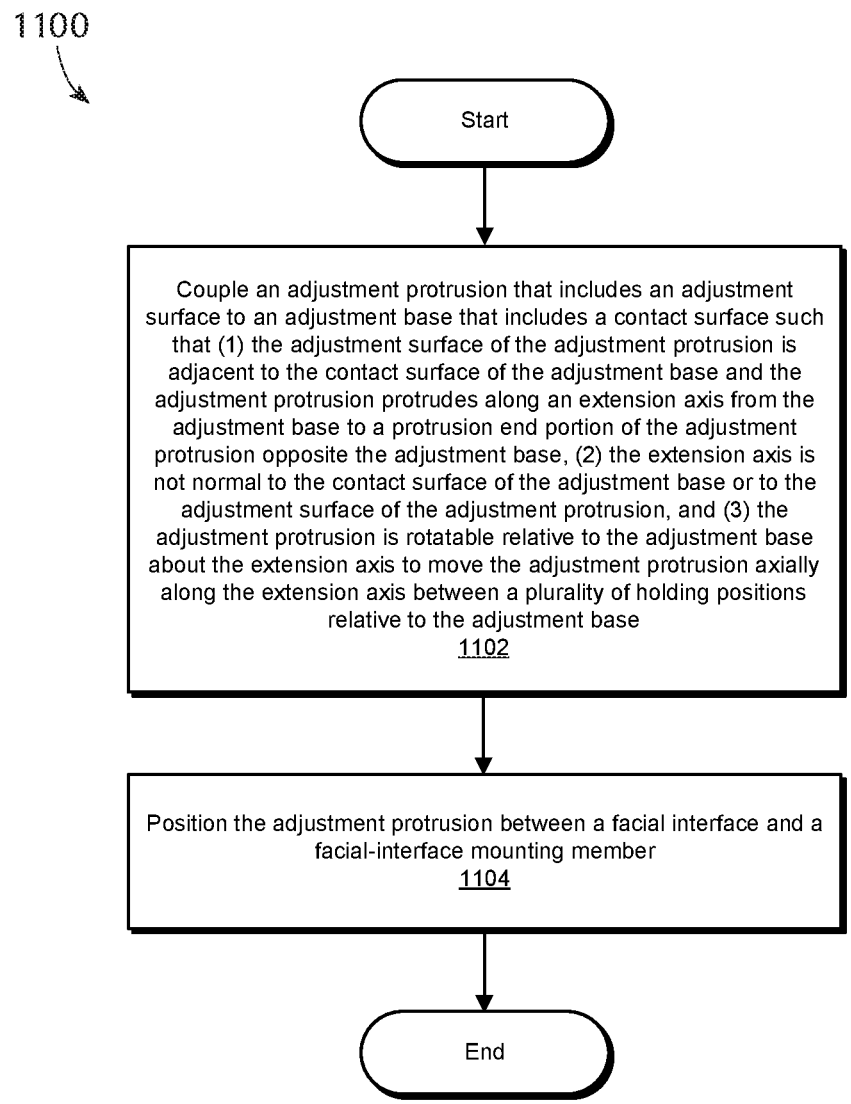
FIG. 11 is a block diagram of an exemplary method for assembling a facial-interface system for a head-mounted display in accordance with some embodiments.

FIG. 11 is a flow diagram of an exemplary method 1100 for assembling a facial-interface system for a head-mounted display according to any of the embodiments disclosed herein. The steps shown in FIG. 11 may be performed by an individual and/or by any suitable manual and/or automated apparatus.

At step 1102 in FIG. 11, an adjustment protrusion that includes an adjustment surface may be coupled to an adjustment base that includes a contact surface such that (1) the adjustment surface of the adjustment protrusion is adjacent to the contact surface of the adjustment base and the adjustment protrusion protrudes along an extension axis from the adjustment base to a protrusion end portion of the adjustment protrusion opposite the adjustment base, (2) the extension axis is not normal to the contact surface of the adjustment base or to the adjustment surface of the adjustment protrusion, and (3) the adjustment protrusion is rotatable relative to the adjustment base about the extension axis to move the adjustment protrusion axially along the extension axis between a plurality of holding positions relative to the adjustment base.

For example, adjustment protrusion 134, which includes adjustment surface 140, may be coupled to adjustment base 145, which includes a contact surface 146 (see, e.g., FIGS. 3-5B; see also, FIGS. 6B-7B). In this example, adjustment surface 140 of adjustment protrusion 134 may be adjacent to contact surface 146 of adjustment base 145 and adjustment protrusion 134 may protrude along extension axis 154 from adjustment base 145 to protrusion end portion 136 of adjustment protrusion 134 opposite adjustment base 145 (see, e.g., FIGS. 4A-5B; see also, FIGS. 6B-7B). Extension axis 154 may not be normal to contact surface 146 of adjustment base 145 or to adjustment surface 140 of adjustment protrusion 134 (see, e.g., FIGS. 4A-5B; see also, FIGS. 6B-7B). Adjustment protrusion 134 may be rotatable relative to adjustment base 145 about extension axis 154 to move adjustment protrusion 134 axially along extension axis 154 between a plurality of holding positions (e.g., the contracted holding position and the extended holding position) relative to adjustment base 145 (see, e.g., FIGS. 3-5B; see also, FIGS. 6B-7B).

At step 1104 in FIG. 11, the adjustment protrusion may be positioned between a facial interface and a facial-interface mounting member. For example, adjustment protrusion 134 may be positioned between facial interface 110 and facial-interface mounting member 118 (see, e.g., FIGS. 5A and 5B).

As discussed throughout the instant disclosure, the disclosed methods, systems, and devices may provide one or more advantages over traditional facial-interface systems. For example, the facial-interface adjustment apparatuses may enable users to quickly and easily adjust facial interfaces. The facial-interface adjustment apparatuses may be disposed between facial interfaces and corresponding facial-interface mounting members of head-mounted-display devices such that the facial interfaces are adjustable between a plurality of positions relative to the facial-interface mounting members through adjustment of the facial-interface adjustment apparatuses. The facial-interface systems may thus enable users to position the facial interfaces so as to comfortably fit head-mounted displays to various user face sizes and shapes. The facial-interface systems may also enable users to wear accessories, such as glasses, while wearing the head-mounted displays. Accordingly, the facial-interface systems may allow users to adjust and comfortably wear head-mounted displays without having to replace the facial interfaces and/or interface cushions.

The foregoing description, for purposes of explanation, has been described with reference to specific embodiments and has been provided to enable others skilled in the art to best utilize various aspects of the example embodiments disclosed herein. However, the illustrative discussions above are not intended to be exhaustive or to limit the scope of the claims to the precise forms disclosed. Many modifications and variations are possible in view of the above teachings without departing from the spirit and scope of the instant disclosure. The instant disclosure covers all modifications, equivalents, and alternatives falling within the scope of the appended claims. Features from any of the above-mentioned embodiments may be used in combination with one another in accordance with the general principles described herein. The embodiments were chosen to best explain the principles underlying the claims and their practical applications, to thereby enable others skilled in the art to best use the embodiments with various modifications as are suited to the particular uses contemplated. The embodiments disclosed herein should be considered in all respects illustrative and not restrictive. Reference should be made to the appended claims and their equivalents in determining the scope of the instant disclosure.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

It will also be understood that, although the terms first, second, etc. are, in some instances, used herein to describe various elements, these elements should not be limited by these terms. These terms are used only to distinguish one element from another. For example, a first segment could be termed a second segment, and, similarly, a second segment could be termed a first segment, without departing from the scope of the various described embodiments. The first segment and the second segment are both segments, but they are not the same segment.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind." Unless otherwise noted, the terms "connected to," "coupled to," and "attached to" (and their derivatives), as used in the specification and claims, are to be construed as permitting both direct and indirect (i.e., via other elements or components) connection. Furthermore, two or more elements may be coupled together with an adhesive, a clasp, a latch, a hook, a link, a buckle, a bolt, a screw, a rivet, a snap, a catch, a lock, or any other type of fastening or connecting mechanism.

What is claimed is:

1. A facial-interface system for a head-mounted display comprising:
   a facial interface;
   a facial-interface mounting member; and
   a facial-interface adjustment apparatus disposed between the facial interface and the facial-interface mounting member, the facial-interface adjustment apparatus comprising:
      an adjustment base comprising a contact surface; and
      an adjustment protrusion that protrudes along an extension axis from the adjustment base to a protrusion end portion of the adjustment protrusion opposite the adjustment base, the adjustment protrusion comprising an adjustment surface that is adjacent to the contact surface of the adjustment base;
   wherein:
      the extension axis is not normal to the contact surface of the adjustment base or to the adjustment surface of the adjustment protrusion; and
      the adjustment protrusion is rotatable relative to the adjustment base about the extension axis to move the adjustment protrusion axially along the extension axis between a plurality of holding positions relative to the adjustment base.

2. The facial-interface system of claim 1, wherein the facial-interface adjustment apparatus further comprises a spring that biases the adjustment protrusion toward the adjustment base.

3. The facial-interface system of claim 2, wherein:
   the facial-interface adjustment apparatus further comprises a spring holding member that is coupled to the adjustment base and that extends into an adjustment-protrusion recess defined within the adjustment protrusion; and
   the spring is disposed between a spring holding surface of the spring holding member and an internal biasing surface of the adjustment protrusion.

4. The facial-interface system of claim 1, wherein the facial-interface adjustment apparatus further comprises a coupling magnet disposed at the protrusion end portion.

5. The facial-interface system of claim 4, further comprising a mounting magnet attached to the facial-interface mounting member or the facial interface, wherein the mounting magnet is magnetically coupled with the coupling magnet of the facial-interface adjustment apparatus.

6. The facial-interface system of claim 1, further comprising a mounting recess defined in the facial-interface mounting member or the facial interface, wherein the adjustment protrusion is at least partially disposed within the mounting recess.

7. The facial-interface system of claim 6, wherein:
   the facial-interface mounting member or the facial interface comprises a mounting recess end surface defining an end portion of the mounting recess; and
   the protrusion end portion of the adjustment protrusion abuts the mounting recess end surface.

8. The facial-interface system of claim 1, wherein the facial interface is disposed at a separate one of a plurality of locations relative to the facial-interface mounting member when the adjustment protrusion is held at each of the plurality of holding positions.

9. The facial-interface system of claim 1, wherein the adjustment surface of the adjustment protrusion is substantially parallel to the contact surface of the adjustment base when the adjustment protrusion is held at a contracted holding position of the plurality of holding positions.

10. The facial-interface system of claim 9, wherein the adjustment surface of the adjustment protrusion is not parallel to the contact surface of the adjustment base when the adjustment protrusion is held at a holding position of the plurality of holding positions other than the contracted holding position.

11. The facial-interface system of claim 1, wherein the adjustment protrusion comprises a cylindrical peripheral surface extending between the adjustment surface and the protrusion end portion.

12. The facial-interface system of claim 1, wherein the adjustment protrusion comprises a non-cylindrical peripheral surface extending between the adjustment surface and the protrusion end portion.

13. The facial-interface system of claim 1, wherein the adjustment protrusion further comprises a shaft portion that extends into a shaft holding recess defined in the adjustment base.

14. The facial-interface system of claim 13, wherein the shaft portion is rotatable within the shaft holding recess about the extension axis.

15. The facial-interface system of claim 1, wherein:
   a detent recess is defined in the adjustment base adjacent to the contact surface; and
   a portion of the adjustment protrusion is disposed in the detent recess when the adjustment protrusion is held at an extended holding position of the plurality of holding positions.

16. The facial-interface system of claim 1, wherein:
   the adjustment protrusion comprises a detent surface adjacent to the adjustment surface, the detent surface extending at a different angle than the adjustment surface; and
   the detent surface abuts the contact surface of the adjustment base when the adjustment protrusion is held at an extended holding position of the plurality of holding positions.

17. A head-mounted-display device comprising:
   a facial interface;
   a head-mounted-display housing;
   a facial-interface mounting member coupled to the head-mounted-display housing; and
   a facial-interface adjustment apparatus disposed between the facial interface and the facial-interface mounting member, the facial-interface adjustment apparatus comprising:
      an adjustment base comprising a contact surface; and
      an adjustment protrusion that protrudes along an extension axis from the adjustment base to a protrusion end portion of the adjustment protrusion opposite the adjustment base, the adjustment protrusion comprising an adjustment surface that is adjacent to the contact surface of the adjustment base;

wherein:

the extension axis is not normal to the contact surface of the adjustment base or to the adjustment surface of the adjustment protrusion; and the adjustment protrusion is rotatable relative to the adjustment base about the extension axis to move the adjustment protrusion axially along the extension axis between a plurality of holding positions relative to the adjustment base.

18. The head-mounted-display device of claim 17, wherein the facial-interface adjustment apparatus further comprises a spring that biases the adjustment protrusion toward the adjustment base.

19. The head-mounted-display device of claim 17, wherein the facial interface is disposed at a separate one of a plurality of locations relative to the facial-interface mounting member when the adjustment protrusion is held at each of the plurality of holding positions.

20. A method comprising:

coupling an adjustment protrusion comprising an adjustment surface to an adjustment base comprising a contact surface such that:

the adjustment surface of the adjustment protrusion is adjacent to the contact surface of the adjustment base and the adjustment protrusion protrudes along an extension axis from the adjustment base to a protrusion end portion of the adjustment protrusion opposite the adjustment base;

the extension axis is not normal to the contact surface of the adjustment base or to the adjustment surface of the adjustment protrusion; and the adjustment protrusion is rotatable relative to the adjustment base about the extension axis to move the adjustment protrusion axially along the extension axis between a plurality of holding positions relative to the adjustment base; and positioning the adjustment protrusion between a facial interface and a facial-interface mounting member.

\* \* \* \* \*